(12) United States Patent
Blue et al.

(10) Patent No.: US 7,945,918 B2
(45) Date of Patent: May 17, 2011

(54) GENERALIZED WBEM/CIM INDICATION PROVIDER SIMULATION ENGINE

(75) Inventors: Dale E. Blue, Poughkeepsie, NY (US); James E. Koopman, Kingston, NY (US); James McGurl, Poughkeepsie, NY (US); Adam L. Salvatori, Wappingers Falls, NY (US); Ruy E. Tiapula De Alencar, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 11/771,324

(22) Filed: Jun. 29, 2007

(65) Prior Publication Data
US 2009/0007144 A1    Jan. 1, 2009

(51) Int. Cl.
*G06F 13/00* (2006.01)

(52) U.S. Cl. .......... 719/327; 719/318; 719/328; 703/17; 703/21; 703/22; 709/223; 709/224

(58) Field of Classification Search .................. 719/318, 719/327, 328; 703/17, 21, 22; 709/223, 709/224
See application file for complete search history.

(56) References Cited

U.S. PATENT DOCUMENTS

| 5,910,180 A * | 6/1999 | Flory et al. ............ 719/321 |
| 6,393,495 B1 * | 5/2002 | Flory et al. ............ 719/327 |
| 6,880,158 B1 * | 4/2005 | Basso et al. ............ 719/321 |

* cited by examiner

*Primary Examiner* — Andy Ho
(74) *Attorney, Agent, or Firm* — William A. Kinnaman, Jr.

(57) ABSTRACT

A simulator of WBEM/CIM indication providers conforming to the CIM Indication Provider object specification simulates both the CIM indication provider and the means to drive the associated CIM events. The simulator comprises three functionally unique pieces: one or more CIM indication provider drivers, one or more CIM event trigger drivers, and a control application. This modularization creates flexibility in configuring the simulator to stress test different aspects of an operating system's underlying support for CIM indications. Modularization also makes the simulator design operating system independent. Provision is made in the simulation for generation of additional CIM events as background activity on the operating system.

18 Claims, 7 Drawing Sheets

GENERALIZED WBEM/CIM INDICATION PROVIDER SIMULATION ENGINE

BACKGROUND OF THE INVENTION

1. Field of the Invention

This invention relates to a method and apparatus for simulating an indication provider, especially a WBEM/CIM indication provider for the purpose of testing a computer operating system's underlying support for such indication providers.

2. Description of the Related Art

The Common Information Model (CIM) is an open standard that, according to its promulgator, the Distributed Management Task Force (DMTF), "provides a common definition of management information for systems, networks, applications and services, and allows for vendor extensions"; its common definitions "enable vendors to exchange semantically rich management information between systems throughout the network". CIM has been developed in conjunction with Web-Based Enterprise Management (WBEM), characterized by the same promulgator as "a set of management and Internet standard technologies developed to unify the management of distributed computing environments"; WBEM "provides the ability for the industry to deliver a well-integrated set of standard-based management tools, facilitating the exchange of data across otherwise disparate technologies and platforms". Current versions of CIM and WBEM are well known in the art and are described on Web pages published by DMTF. The basic relationship between the two standards is that CIM provides underlying support for WBEM.

WBEM and CIM have the notion of 'indication providers'. An indication provider is a mechanism (implemented in software) that allows an end user or controlling program to monitor for the occurrence of 'CIM event(s)' of interest on a target computer system and to be notified when the event has occurred. In the WBEM architecture, the end user or controlling program is operating system independent (at a source code or application programming interface (API) level), while the indication provider is operating system dependent. In addition, the end user or controlling program may be executing on the target operating system or on a remote system.

FIG. 1 shows the interface between the overall WBEM/CIM architecture and an operating system's underlying WBEM/CIM indication provider support in a conventional computer system 100. More particularly, in the system 100 shown in FIG. 1, an end user or controlling program 102 interacts with a CIM server 104 through a client interface 106 of the CIM server. Also associated with the CIM server 104 are a data repository 108, security plugins 110 and an indication provider 112. CIM server 104 runs on a target operating system (OS) 114 having OS-specific indication provider support 116 with which the indication provider 114 interacts. Although the present invention is not limited to any particular operating system, one suitable operating system is the IBM z/OS operating system, running on an IBM System z server (not separately shown).

As depicted in FIG. 1, the CIM indication provider 112 on the target operating system 114 makes use of the underlying operating system-specific support 116 to detect the occurrence of an actual CIM event. Some currently available CIM testing tools do allow for functional validation of CIM indication providers 112 and the underlying operating system support 116. They typically do this by simulating an end user or controlling program 102, as shown in FIG. 1. Because of this approach they are lacking in their ability to easily drive high levels of stress on the underlying operating system-specific indication provider support 116. Such stress testing is desired in a software system-level test, as it uncovers a different class of problems than is exposed by functional-level testing that focuses on coverage of all code paths.

BRIEF SUMMARY OF THE INVENTION

In general, the present invention contemplates a method and apparatus for simulating an indication provider to test operating system support functionality therefor as defined in the appended independent claims. Preferred embodiments thereof are defined in the subclaims. The invention is preferably implemented as a software program, more particularly, a computer program product stored on a computer usable medium, comprising computer readable program means for causing a computer to perform the invention.

More particularly, the present invention contemplates an indication provider simulator, preferably a CIM indication provider simulator (CIPS), that combines a platform-independent control application with small replaceable platform-dependent drivers of the underlying operating system indication provider support. The control application contains functionality to support the concepts (e.g., WBEM/CIM concepts) basic to indication providers on any operating system platform.

Preferably, the platform-dependent drivers are divided into two sets. The first set of drivers consists of drivers associated with operating system-specific application programming interfaces (APIs) that monitor for CIM events. These APIs are used in a manner consistent with a real CIM indication provider object so that the underlying operating system indication provider support is exercised in a manner consistent with a real-world usage.

The second set of drivers consists of drivers associated with causing the system activity needed to trigger a CIM event. The amount of stress on the operating system's indication provider infrastructure is a function of the rate of triggering-related system events. This trigger rate is dynamically controllable by the end user of the simulator of the present invention.

Dividing the operating system-dependent drivers into two parts allows for multiple instances of simulators to cooperate in a test to allow additional control over the amount of stress placed on the target operating system indication provider support.

Furthermore, the simulator of the present invention is able to generate additional CIM event triggers that are not being monitored for by any CIM indication provider. This tests the underlying operating system indication provider support's ability to filter only events of interest.

BRIEF DESCRIPTION OF THE SEVERAL VIEWS OF THE DRAWINGS

FIG. 7 shows the use of a simulator to create a CIM event that a real CIM Object Monitor (CIMOM) has subscribed to.

DETAILED DESCRIPTION OF THE INVENTION

Figure 1:
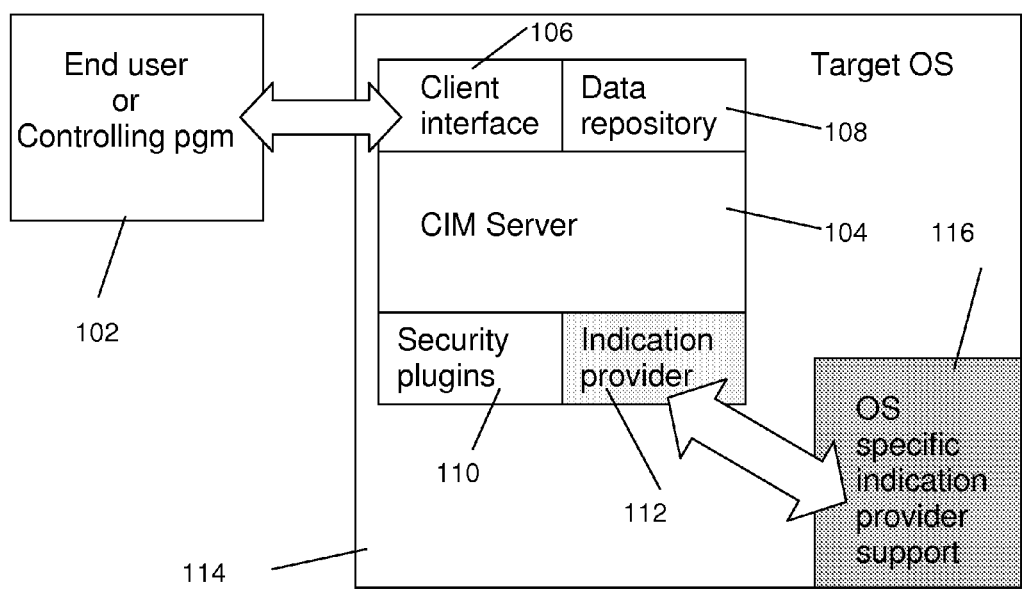
FIG. 1 shows the interface between the overall WBEM/CIM architecture and an operating system's underlying WBEM/CIM indication provider support.
Figure 2:
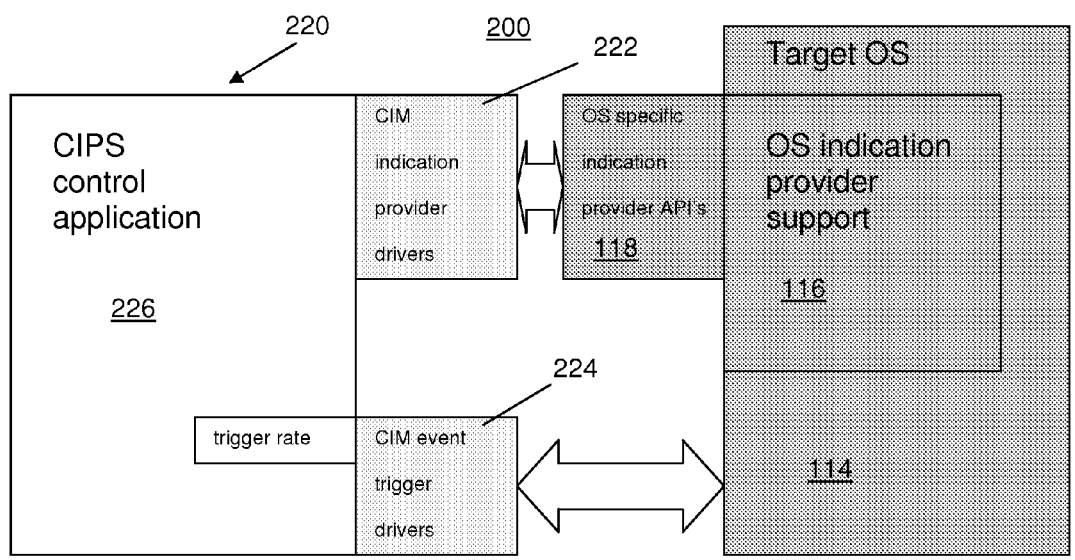
FIG. 2 shows the two types of software drivers used by the CIM indication provider simulator of the present invention.

FIG. 2 shows a computer system 200 containing a CIM indication provider simulator (hereinafter, simply "simulator") 220 constructed in accordance with the present invention. Simulator 220 interoperates with elements 112, 114 and 116, which are the same as the like-numbered elements shown in FIG. 1.

Simulator 220 tests the operating system indication provider support 116 by allowing that support to be isolated from the overall WBEM/CIM architecture (elements 102, 104 and 112 in FIG. 1) and driven directly. This is accomplished by dividing the simulator 220 into three subcomponents as depicted in FIG. 2. Referring to that figure, the simulator 220 comprises one or more CIM indication provider drivers 222, one or more CIM event trigger drivers 224, and a control application 226.

Such an arrangement provides the following advantages. The control application 226 is platform independent (like the end user or controlling program 102, at a source code or API level) and can be used to test various operating systems besides the target operating system 114. This is especially important, as WBEM is intended to be a platform-independent architecture. The rate of stress on the target operating system 114 is dynamically determined by the tester via control of the rate of triggering events, as described below. Dividing the operating system-dependent drivers into two sets 222 and 224 allows for multiple instances of the simulator 220 to cooperate in a test with the intent of allowing additional control over the amount of stress placed on the target operating system.

Tables 1, 2, and 3 describe the set of functions implemented by each of the three simulator subcomponents.

The CIM indication provider drivers 222 respond to requests for the functions related to monitoring for CIM events that are listed in Table 1. These functions map directly to the required methods of a CIM indication provider as described by Open Pegasus CIM Indication Provider object specification. Background information on these functions may be found in the document entitled "PEGASUS Public APIs", version 1.01, Oct. 30, 2003, Pegasus 2.3, especially the page for the class CIMIndicationProvider, available online from the Web site of The Open Group and incorporated herein by reference.

Because the indication provider driver 222 conforms to the Open Pegasus CIM Indication Provider object specification, it is feasible that an existing CIM indication provider object could be used directly as a CIPS indication provider driver. In practice, it is preferable that a specific driver be written for this purpose that is more generic in nature than an existing CIM indication provider.

Each function calls the operating system API or APIs 118 (FIG. 3) that are appropriate to accomplish the intended functionality. It is important to note that a particular operating system may or may not provide APIs that correspond to these functions on a one-to-one basis. (For instance the z/OS operating system requires a 'connect' function prior to the first 'subscribe' request. Also, it does not have an API that allows modification of an existing event.)

TABLE 1

CIM indication provider driver functions

| Function | Description |
|---|---|
| createSubscription | Invokes the OS-specific indication provider API(s) necessary to monitor for a specific event. |
| deleteSubscription | Invokes the OS-specific indication provider API(s) necessary to stop monitoring for a specific event. |
| modifySubscription | Invokes the OS-specific indication provider API(s) necessary to modify some specific attributes of a previous subscribe request. |
| enableIndications | Invokes the OS-specific indication provider API(s) necessary to allow the flow of events to the simulator. |
| disableIndications | Invokes the OS-specific indication provider API(s) necessary to stop the flow of events to the simulator. |

The CIM event trigger drivers 224 respond to requests for the functions listed in Table 2 related to triggering a specific CIM event. Each function calls the operating system API or APIs that are appropriate to accomplish the intended functionality. As in the case of the indication provider drivers 222, the operating system 114 may or may not provide APIs that correspond to these functions on a one-to-one basis. This applies especially to the 'generate' and 'monitor' functions. The 'validate' function is called directly by the simulator 220 (in response to a 'receive' of CIM indication data) and should preferably always be implemented.

TABLE 2

CIM event trigger driver functions

| Function | Description |
|---|---|
| generate | Invokes the OS-specific services necessary to trigger the desired CIM event. |
| monitor | Use OS-specific indication provider API(s) to be notified when the triggered event has occurred. This allows for any required transformation or further filtering of the CIM event data prior to its being sent as a CIM event to the indication provider driver. (Such is the case with the z/OS operating system.) |
| validate | Validate the CIM event information returned by the operating system against the expected information |

The CIPS control application 226 provides a central point of control for the indication provider drivers 224 and event trigger drivers 226. One possible set of end user controls are listed in Table 3. These controls would typically (but not necessarily) be implemented as commands. Any suitable means may be used to enter these commands, such as a UNIX command line.

Most of the commands listed in Table 3 correspond directly to driving the functions defined for the CIM indication provider drivers 222 and the CIM event trigger driver 224. Two exceptions should be noted. The 'noise' and 'unnoise' commands are provided to control triggering events for which the simulator 220 is not subscribed. This is useful in testing the ability of the operating system indication provider support to filter only events of interest. The 'statistics' command allows for collection and reporting of data related to a specific event.

TABLE 3

Simulator user commands

| Function | Description |
|---|---|
| subscribe | Prepares the simulator for generation and tracking of a CIM event and then invokes 'createSubscription' on the indication provider driver. For any one CIM event 'subscribe' is mutually exclusive with 'noise'. |
| modify | Updates the simulator to change some of the attributes of an event that was previously subscribed to and then invokes 'modifySubscription' on the indication provider driver. |
| unsubscribe | Invokes 'deleteSubscription' on the indication provider driver and performs any necessary cleanup in the simulator. |
| enable | Prepares the simulator to begin receiving CIM events and then invokes 'enableIndications' on the indication provider driver. One or more 'subscribe'(s) must precede the 'enable'. |
| disable | Invokes 'disableIndications' on the indication provider driver and performs any necessary cleanup in the simulator. |
| noise | Prepares the simulator for generation and tracking of a CIM event. The 'createSubscription' indication driver function is not invoked. For any one CIM event 'noise' is mutually exclusive with 'subscribe'. |
| unnoise | Performs any necessary cleanup in the simulator. |
| start | Instructs the simulator to begin calling 'generate' on the CIM event trigger driver for an event that was defined on a previous 'subscribe' or 'noise' command. Input options to the 'start' function provide control for the rate of triggering events. |
| stop | Instructs the simulator to stop calling 'generate' on the CIM event trigger driver. |
| status | Causes the simulator to report the statistics for a specific CIM event (number of events generated, number of events received, etc.) |

Figure 3:
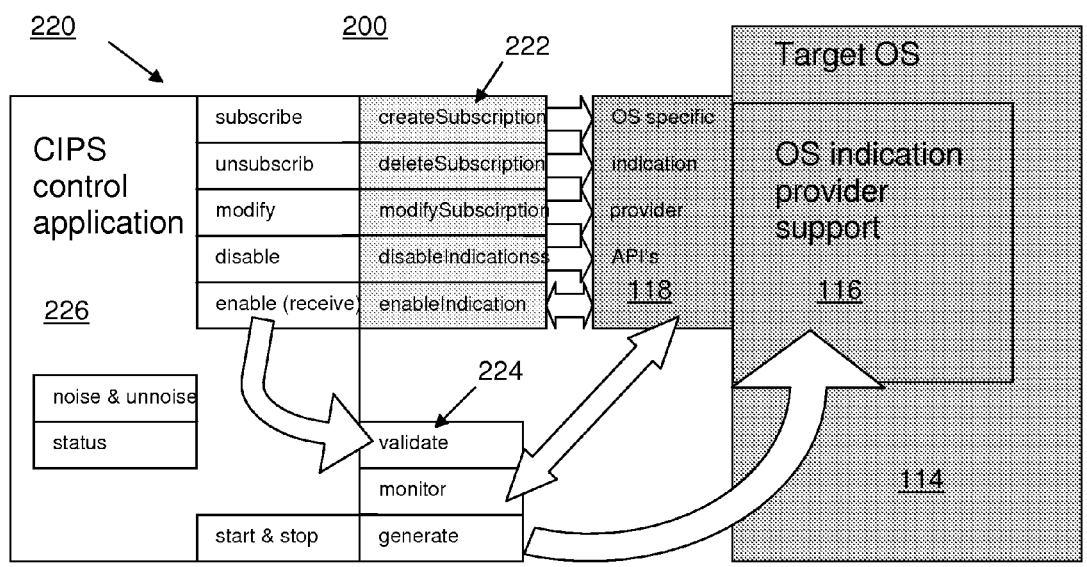
FIG. 3 shows the specific interfaces and functions that make up the CIM indication provider simulator of the present invention and maps the data flow of a CIM event.

FIG. 3 maps the typical data flow for a CIM event. First, 'subscribe' and 'enable' requests, or a 'noise' request is issued as a necessary prerequisite to the 'start' command. The 'start' command then causes a triggering event to be generated.

Next, the OS indication provider function 116 detects the event and determines that the simulator 220 is subscribed. It passes information about the event to the 'monitor' interface (FIG. 3) of the event trigger driver 224. The monitor then returns to the OS indication provider function 116, which passes the event information to the waiting 'receive' function in the control application 226.

The final step is to pass the received event information to 'validate' (by invoking the 'validate' function of the event trigger driver 224) to be checked for accuracy.

The amount of stress on the OS indication provider support 116 is determined by the number and rate of different events being driven by the simulator 220.

The command set for the simulator 220 allows it to utilize only the functions of the indication provider drivers 222, only the functions of the CIM event trigger drivers 224, or the functions of both drivers 224 and 226 together. This allows the simulator 220 to run in several configurations as shown in FIGS. 4-7. The different configurations allow for stressing different facets of the operation system's indication provider infrastructure, as shown in the examples described below.

Figure 4:
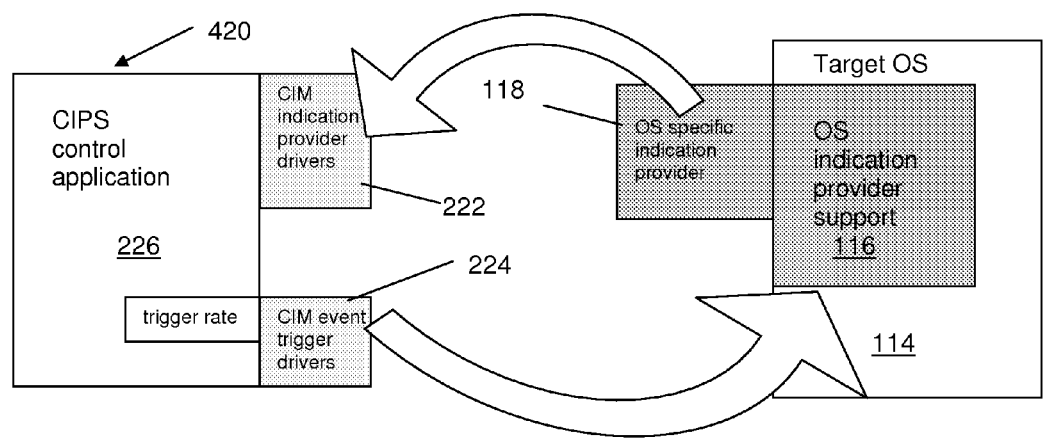
FIG. 4 shows a simulator configured for balanced event triggers and event subscribers.

In FIG. 4, a single simulator instance 420 similar to simulator 220 in FIG. 2 is configured to utilize both its indication provider drivers 222 and its event trigger drivers 224. In this configuration, instance 420 simulates a single indication provider listening for one or more types of events. It is a balanced test in that the occurrence of one CIM event results in an event notification being delivered to a single indication provider.

Figure 5:
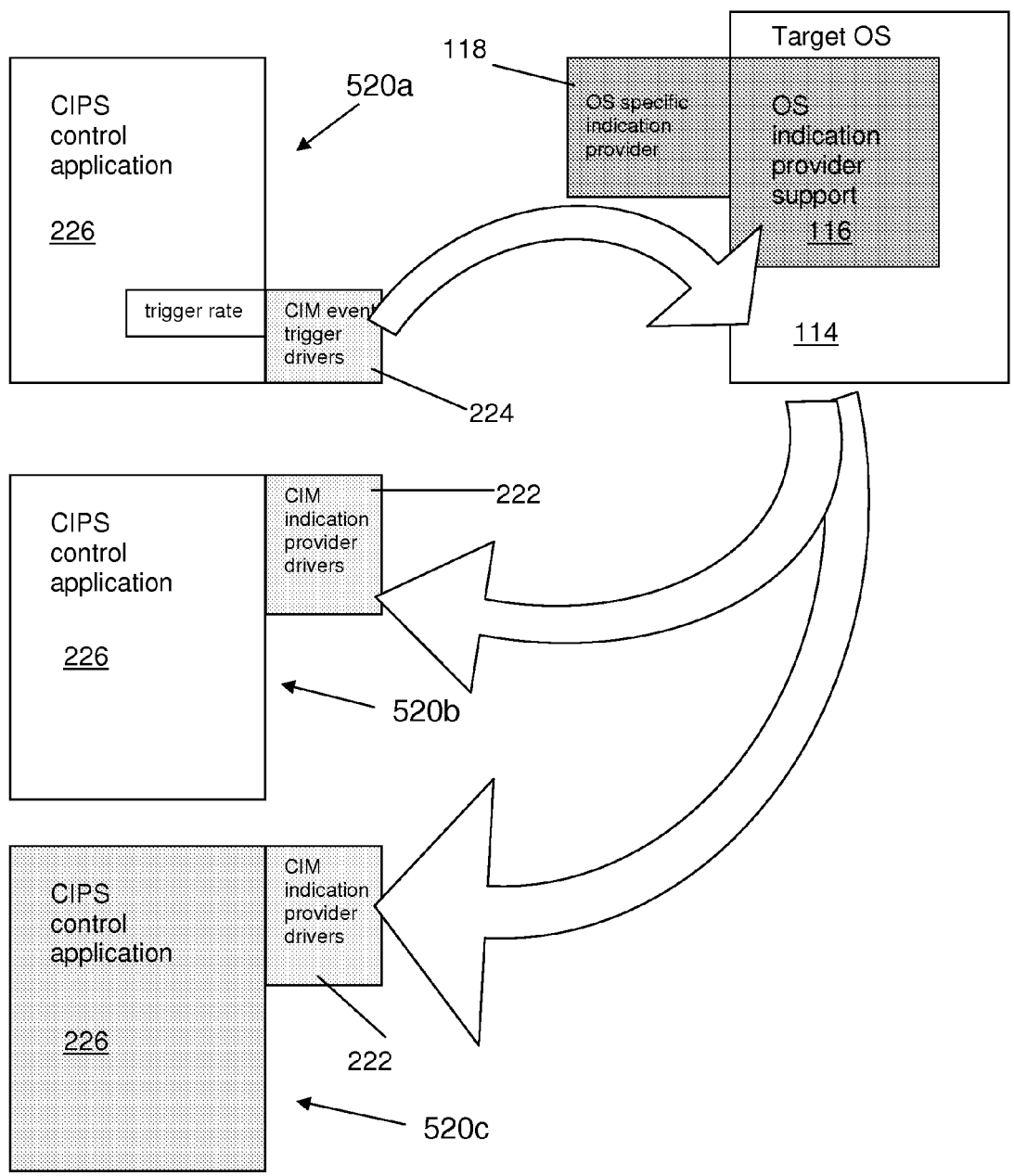
FIG. 5 shows a simulator configuration with a single event trigger and multiple event subscribers.

In FIG. 5, three simulator instances 520a-520c, each of which is similar to simulator 220 in FIG. 2, are used to simulate multiple indication providers listening for a single type of CIM event. The first simulator instance 520a is configured to utilize only its event trigger drivers 224, while the other two simulator instances 520b and 520c are configured to utilize only their indication provider drivers 222.

Figure 6:
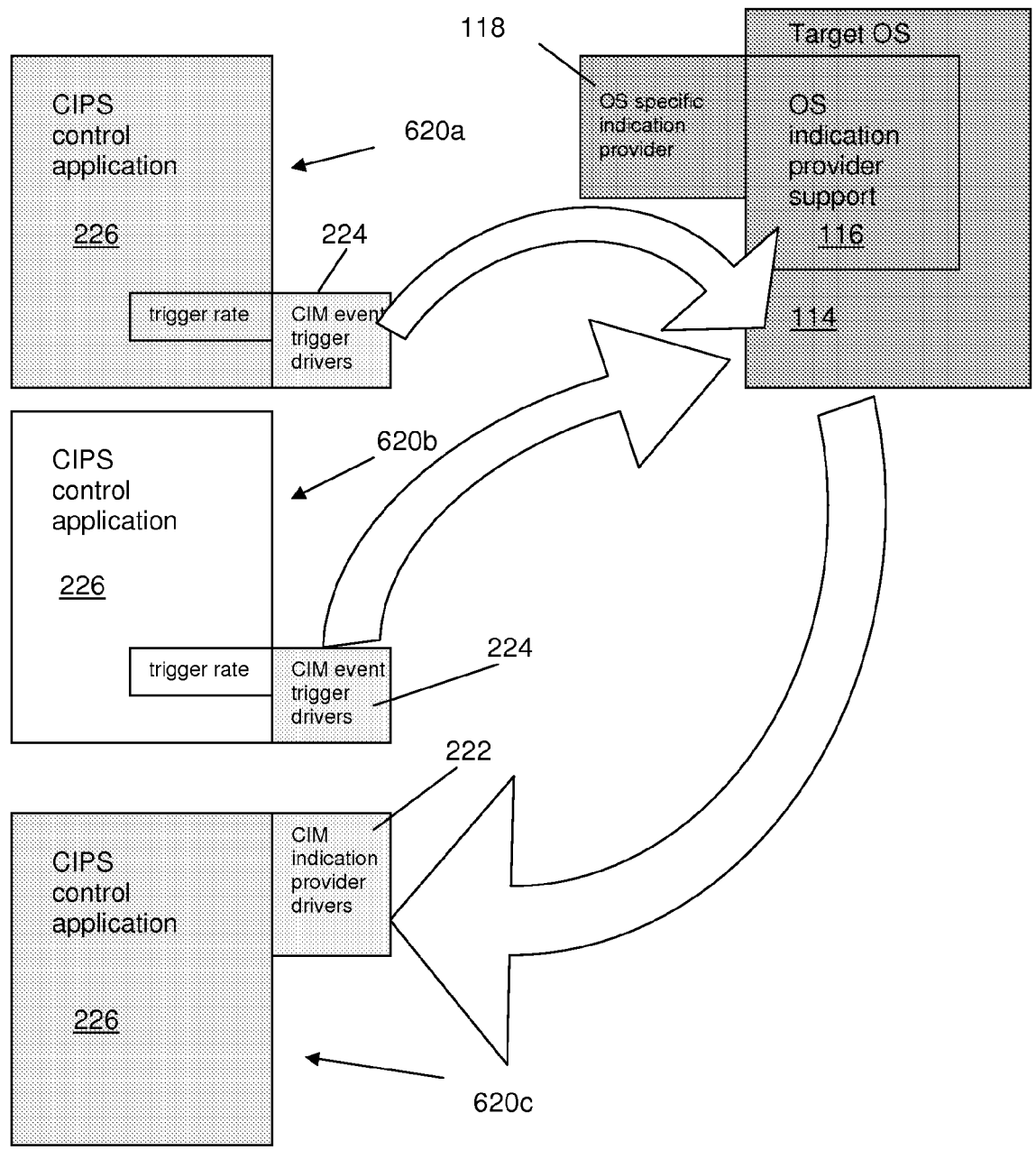
FIG. 6 shows a simulator configured for event trigger flooding.

FIG. 6 demonstrates the converse of FIG. 5. Two simulator instances 620a and 620b, each of which is similar to simulator 220 in FIG. 2, are configured to only generate CIM events that are all targeted to a single simulator instance 620c that is configured to receive them. This simulates an event trigger flooding scenario.

Figure 7:
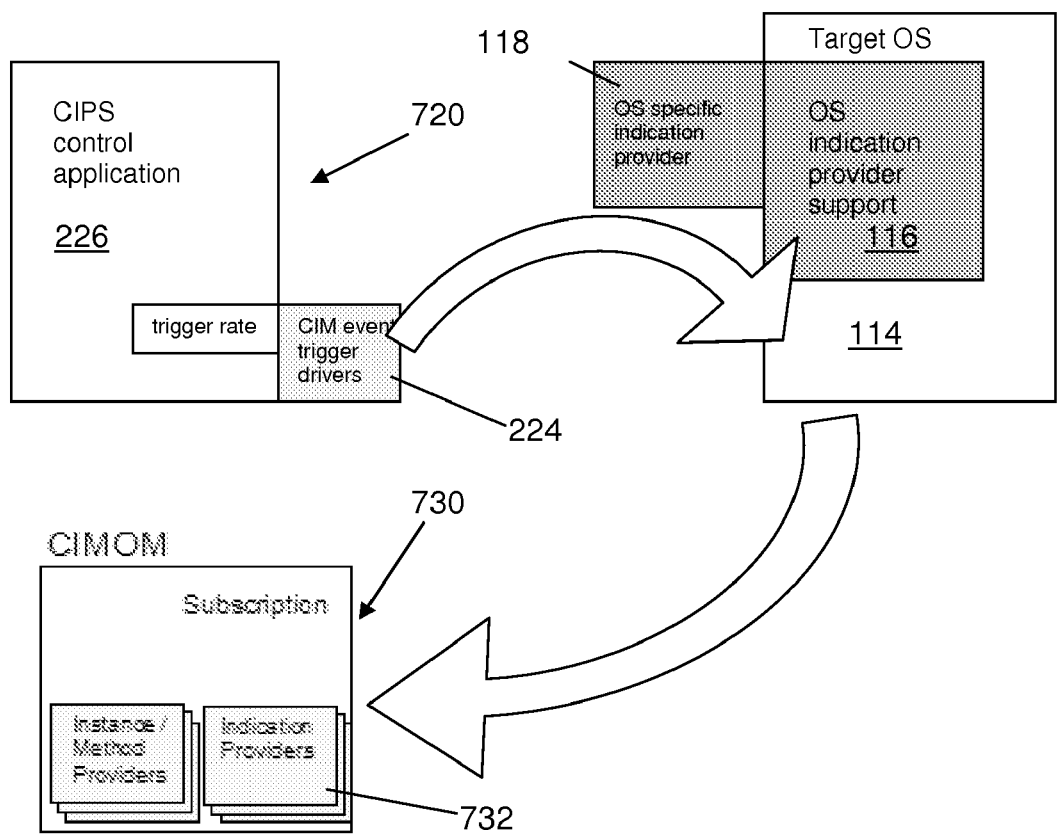

In FIG. 7, only the CIM event trigger driver of a single simulator 720 similar to simulator 220 in FIG. 2 is used. In this configuration, the event listener is a real CIM indication provider 732 hosted on a CIM Object Manager (CIMOM) server 730. CIMOM server 730 may be either on the same or a different system than the target operating system 114.

While particular embodiments have been shown and described, it will be apparent to those skilled in the art that various modifications may be made without departing from the invention as defined in the appended claims. Thus, while the invention has been described in the environment of the IBM z/OS operating system running on an IBM System z server, the invention is not limited to any particular hardware/software platform. Further, while the invention has been described in the context of a WBEM/CIM environment, in its broadest aspects it is not necessarily so limited. Still other variations and modification will be apparent to those skilled in the art.

What is claimed is:

1. Apparatus for simulating an indication provider to test operating system support functionality therefor in a computer system in which an indication provider monitoring for events and executing on an operating system platform interacts over an interface with such support functionality, the support functionality being specific to the operating system platform, the apparatus comprising:
   a platform-dependent driver portion for interacting with the support functionality over the interface; and
   a platform-independent control portion for controlling the driver portion to interact with the support functionality over the interface.

2. The apparatus of claim 1 in which the platform-dependent driver portion comprises:
   an indication provider driver portion responsive to a request for a function related to monitoring for an event; and
   an event trigger driver portion responsive to a request for a function related to triggering a specific event.

3. The apparatus of claim 2 in which the function related to monitoring for an event conforms to Common Information Model (CIM) indication provider specifications.

4. The apparatus of claim 2 in which the event trigger driver portion is operable to trigger associated Common Information Model (CIM) events on the operating system.

5. The apparatus of claim 2 in which the event trigger portion generates triggers at a rate that is controllable by the control portion.

6. The apparatus of claim 2 in which the event trigger portion is operable to generate event triggers that are not monitored by an indication provider.

7. The apparatus of claim 1 in which the indication provider is a Common Information Model (CIM) indication provider and the event is a CIM event.

8. The apparatus of claim 1 in which the indication provider conforms to a Web-Based Enterprise Management (WBEM) architecture.

9. The apparatus of claim 1 in which the control portion controls the driver portion over a platform-independent interface.

10. The apparatus of claim 1 in which the driver portion comprises a replaceable module.

11. The apparatus of claim 1 in which the control portion is responsive to user commands to control the driver portion.

12. A method for simulating an indication provider to test operating system support functionality therefor in a computer system in which an indication provider monitoring for events and executing on an operating system platform interacts with the support functionality over a first interface that is dependent on the operating system platform, the method comprising the steps of:
  directly driving the support functionality over the first interface using a driver module without using the indication provider as an intermediary; and
  controlling the driver module via a control module coupled to the driver module over a second interface that is independent of the operating system platform.

13. The method of claim 12, further comprising the step of:
  triggering a specific event on the operating system platform using an event trigger driver module controlled by the control module.

14. The method of claim 13 in which the event trigger driver module generates triggers at a rate that is controllable by the control module.

15. The method of claim 13 in which the event trigger driver module is operable to generate event triggers that are not monitored by an indication provider.

16. The method of claim 12 in which the control module controls the driver module over a platform-independent interface.

17. The method of claim 12 in which the control module is responsive to user commands to control the driver module.

18. A computer program product stored on a non-transitory computer usable medium, comprising computer readable program means for causing a computer to perform the method of claim 12.

* * * * *